US008257179B2

(12) United States Patent
Stegman

(10) Patent No.: US 8,257,179 B2
(45) Date of Patent: Sep. 4, 2012

(54) NETWORK FOR TOKEN-BASED AND RELATED DEVICES

(75) Inventor: Jeffrey Stegman, Cincinnati, OH (US)

(73) Assignee: The Osborne Coinage Company, Cincinnati, OH (US)

( * ) Notice: Subject to any disclaimer, the term of this patent is extended or adjusted under 35 U.S.C. 154(b) by 112 days.

(21) Appl. No.: 12/953,872

(22) Filed: Nov. 24, 2010

(65) Prior Publication Data

US 2012/0129608 A1 May 24, 2012

(51) Int. Cl.
*G06F 17/00* (2006.01)

(52) U.S. Cl. ........................................................ 463/42

(58) Field of Classification Search .............. 463/40-42; 709/217, 223, 224

See application file for complete search history.

(56) References Cited

U.S. PATENT DOCUMENTS 7,192,113 B2 * 3/2007 Deer et al. ...................... 347/15
2009/0029766 A1 * 1/2009 Lutnick et al. .................. 463/29
2010/0120486 A1 * 5/2010 DeWaal et al. ................. 463/16
2010/0197383 A1 * 8/2010 Rader et al. ..................... 463/25

* cited by examiner

*Primary Examiner* — Ronald Laneau
(74) *Attorney, Agent, or Firm* — Wm. Cates Rambo

(57) ABSTRACT

The present network 10 enables an off-site subscriber 46 to monitor, analyze and alter on-site token-based and related devices without taking them out of service. A central application 20 presents output data from the on-site devices to an off-site subscriber in a useful form and sends input commands from the subscriber 46 to an on-site network interface appliance 18, which relays the commands to a transceiver 26, processor 28 and function monitor/controller 30 installed in the token system device. The transceiver, processor and function monitor/controller are programmed to make output data concerning the on-site devices available to the subscriber and to control selected functions of the device in response to the subscriber's input commands. The network could be added onto currently operating token based and related devices or installed in those yet to be produced.

10 Claims, 2 Drawing Sheets

NETWORK FOR TOKEN-BASED AND RELATED DEVICES

BACKGROUND OF THE INVENTION

1. Field of the Invention

The present invention relates to electronic devices that use tokens and related electronic devices that enhance or support the token-based devices, and more particularly to an Internet-engaging network for monitoring use of the token-based and related devices, adjusting device parameters, and promoting their use to customers.

2. Related Art

Many amusement arcades and family entertainment centers, and perhaps some car washes, laundromats, and parking facilities, rely upon tokens to operate their games or other equipment. Typically, one or more token dispensers are provided on the premises. The customer inserts cash into a token dispenser to receive a selected number of tokens, and then inserts a required number of tokens into a token-accepting device to make it operate. Heretofore, parameters such as the exchange ratio of dollars to tokens and the number of prize or redemption tickets dispensed by the token-accepting machine were adjusted manually. This procedure was not practical to do frequently, especially with customers present. Also, these manual adjustments typically required the attendance of the owner or an upper level employee.

Further, conventional token system machines did not track changes in usage over time to any significant degree. The owner or manager typically relied upon observation to determine when to empty tokens from the machines and re-supply the dispensers. Since customer usage was often uneven, all of the dispensers and machines would likely be checked, even though some would not need emptying or replenishing.

Also, generating more business has been a problem, due in part to customer anonymity. Likewise, the expense of gathering and maintaining customer information and of communicating with those customers has had a limiting effect. A lack of ready-made marketing tools has also contributed to the problem.

There have been efforts to eliminate, or at least ameliorate, the foregoing drawbacks. However, those of which the present inventor is aware involved replacing the token-based system with magnetic card writers and readers and other relatively expensive and sophisticated equipment.

DETAILED DESCRIPTION OF THE ILLUSTRATIVE EMBODIMENT

Figure 1:
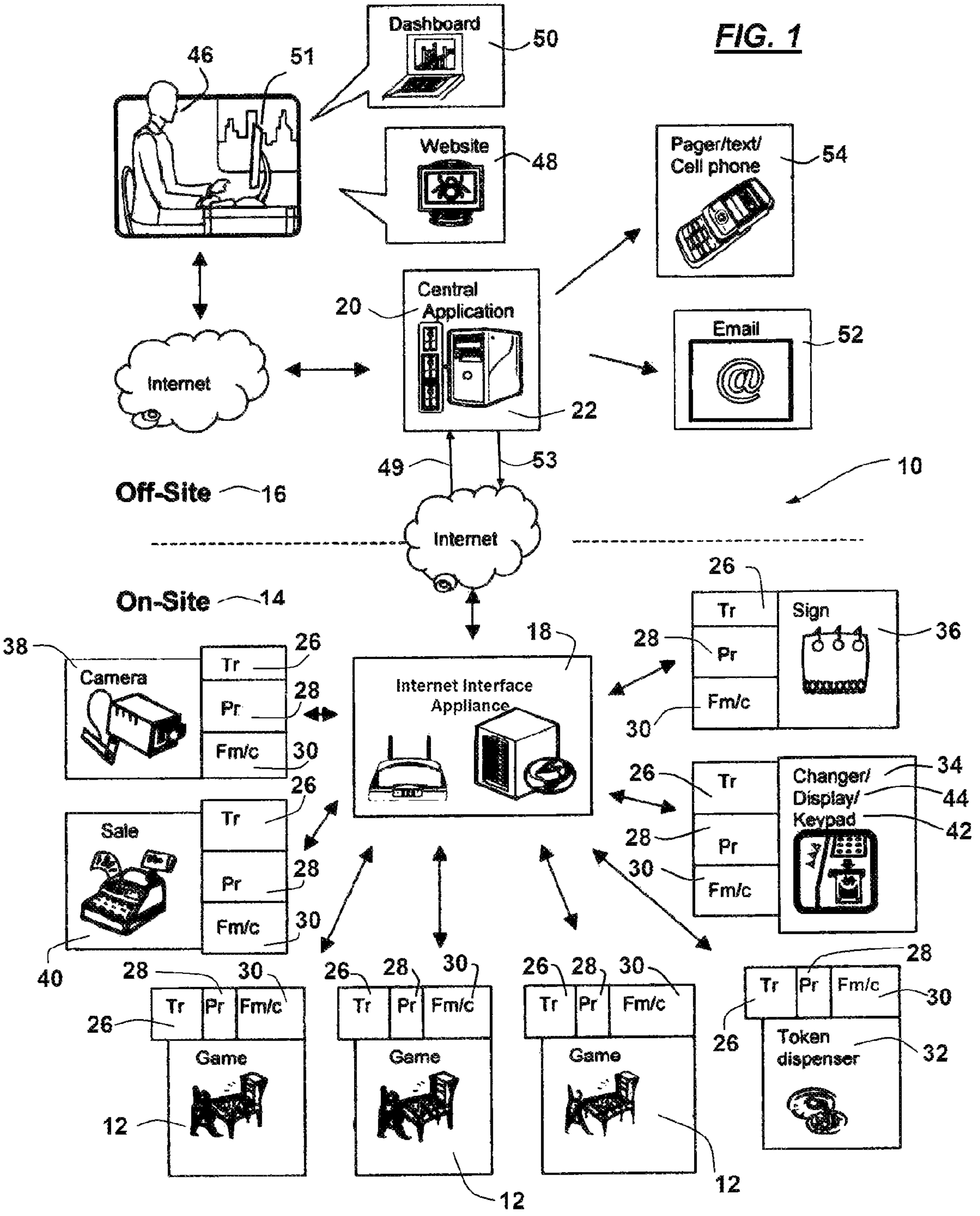
FIG. 1 is a pictorial representation of an illustrative embodiment of a network for token-based and related devices.

As shown in FIG. 1, a network, generally designated 10, for token-based and related devices may be found at an on-site location 14 and at one or more off-site locations 16. For instance, if the on-site location 14 is a game room, the token-based devices may include token-actuated games 12 and one or more token dispensers 32, and the related on-site devices may include Internet interface means, such as a router 18, and one or more bill changers 34, video cameras 38, signs 36 and sales registers 40. Other than the router 18, each of the on-site devices may be provided with a transceiver (Tr) 26, a processor (Pr) 28 and a function monitor/controller (Fm/c) 30. The related network devices at the off-site location(s) may include an Internet-based utility or programming means, such as a central software application 20 and a server 22, customer communication devices such as cell phones 54 and email clients 52, one or more network users or subscribers 46, and subscriber interface means such as a website 48, dashboard software 50 and a computer or smart phone 51 that enable the subscriber to operate the network 10.

Figure 2:
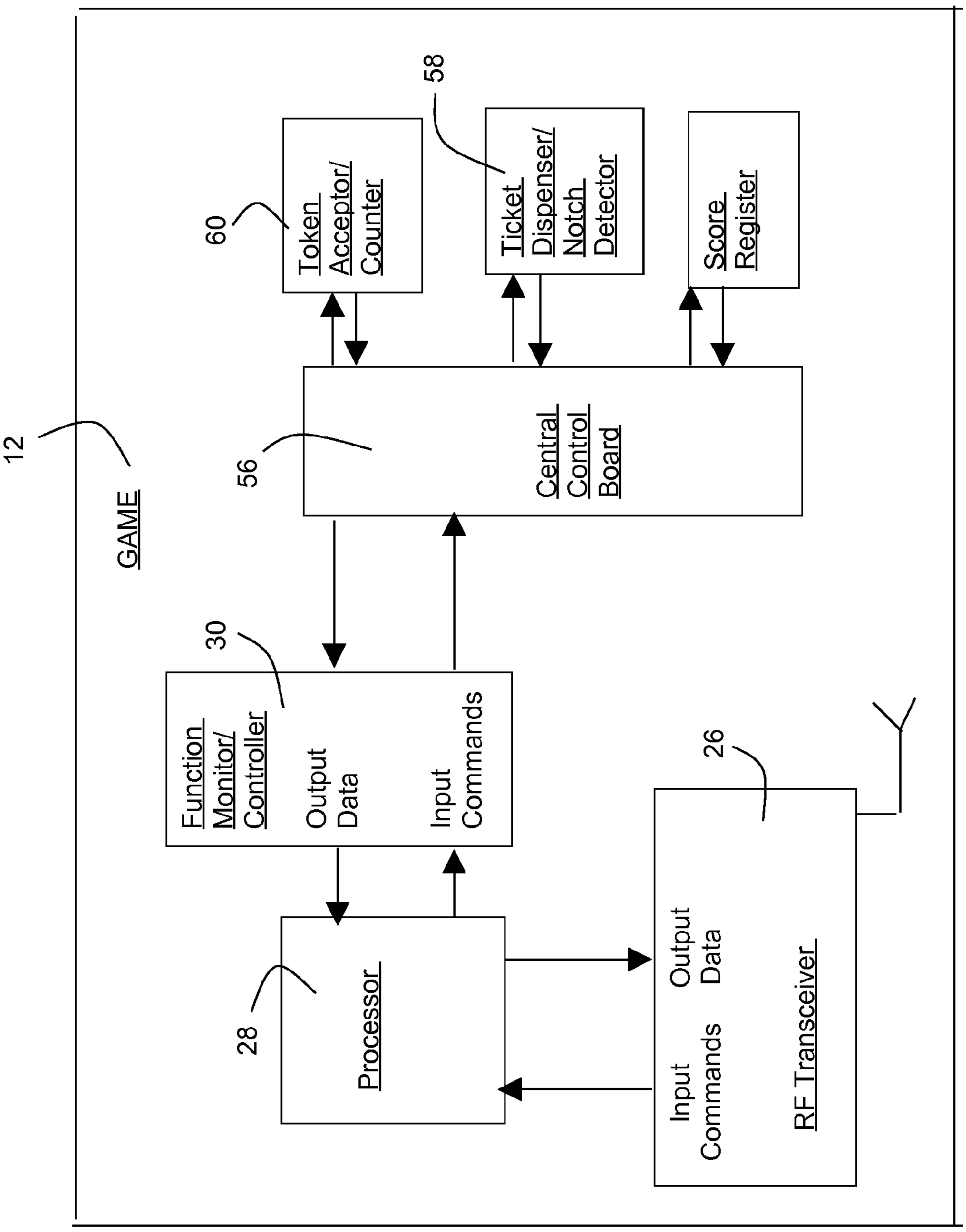
FIG. 2 is a diagram of an add-on function monitor/controller, processor and transceiver attached to operative components of a game.

As illustrated in FIG. 2, a token-based game 12 is provided with a transceiver 26, processor 28 and function monitor/controller 30. Two-way wireless communication, the contents of which are described below, may be established between the router 18 and the transceiver 26 (FIG. 1). The function monitor/controller 30 may be connected to operative components of the game 12, such as a token acceptor/counter 60 and a ticket dispenser/notch detector 58, either directly or via a central control board 56. The function monitor/controller 30 could emulate the inputs and outputs of the control board 56 and the foregoing input and output devices 58, 60. It is contemplated that the transceiver, processor and function monitor/controller could either be factory installed or retro-fitted onto token-based and related devices already in use.

The present network 10 permits output data 49 from the token-based games 12 and related on-site devices to reach the subscriber 46. The function monitor/controller 30 gathers the output data 49 from the operational components 56, 58, 60 of the device. The processor 28 converts the output data into transmissible form, encrypts it and controls the timing of transmissions. The transceiver 26 sends the converted and encrypted output data to the Internet interface appliance 18. The router 18 relays the output data 49 (FIG. 1) via the Internet to the off-site central application 20. The central application 20 may be installed in a dedicated server 22 or in a dedicated portion of the server. The software 20 processes, formats and analyzes the output data. An authorized user or subscriber 46, located off-site 16 where there is Internet access, can log onto a web site 48 hosted by the server 22. The website 48 serves as a secure gateway to the central application 20 and may include a dashboard 50 that helps the user select the output data 49 processed by the central application 20.

The output data available to the subscriber 46 may include the number of and times when a game 12 is played or redemption tickets are dispensed, the number of tokens registered by the game's token acceptor 60, and the scores achieved by game players. The output data may also include the quantity of tokens discharged in a selected period of time from the token dispenser 32, the message being displayed on the signage 36, visual images of the staff, players and games provided by the camera 38, and sales information from the sales register 40. The bill changers 34 might be equipped with a keypad 42 and an electronic display 44 so that the players could be prompted to provide marketing information, such as email addresses and text message numbers.

The output data 49 could be manipulated by the subscriber 46 via the central application 20, website 48, a dashboard 50 and the computer and/or smart phone 51. For instance, the subscriber could design and download images that could be printed or otherwise applied to promotional material. The subscriber could track use of the games 12 over time, the level of tokens in the token acceptors 60, the number and conditions when the ticket dispenser 58 issues redemption tickets or coupons, and game scores being registered. Likewise, the user 46 could track and analyze output data from the sales registers 40, personnel and customer behavior from the cameras 38 and the flow of money into and tokens out of the token dispensers 32 and changers 34. A group of subscribers 46 employing similar token system machines could submit selected output data, and the central application 20 could make industry or area-wide analyses of this pooled output data available to the group.

The present network 10 could be used to gather customer information by providing incentives for customers to supply email addresses 52 or pager/text/cell phone numbers 54. For instance, the subscriber could indicate on the signs 36 and/or the changer displays 44 that if customers enter the desired information on the changer keypad 42, a code redeemable for a selected number of games or tokens would be sent to their email address 52 or pager/text/cell number 54. With the desired information, the subscriber could notify customers when it is "half price night" or when other incentives are available to increase use. In addition, the web site 48 could include one or more sign-making templates where the subscriber would be able to design and download images that could be printed.

In addition to monitoring and analyzing output data 49 and using the data for marketing purposes, it is contemplated that the subscriber could create input commands 53 to alter selected functions within the on-site devices. The alterations could be accomplished without requiring manual, on-site activity. These changes would permit adaptation to locally changing market conditions and maximize use of the on-site devices without interrupting play.

Such alterable functions are, for example, the number of tokens required to actuate the game, the number or frequency of redemption tickets dispensed and the number of tokens dispensed per unit of currency. Likewise, the subscriber 46 could use input commands 53 to communicate with customers by changing the signs 36, the displays 44 on the changers 34 and the displays on the games 12. With the foregoing changes, the subscriber could attract customers and announce these changes with the signs 36.

The subscriber could use the interface equipment 48, 50, 51, and the central application 20 to create an input command, such as the number of tokens required to actuate a game 12. The central program or application 20 would send the desired input command through the Internet to the Internet interface appliance 18, which would relay the input command to the transceiver 26 on the game 12. The processor 28 would decode and convert the input command to a format that emulates the native inputs and outputs of the game 12. The function monitor/controller 30 would route the input command 53 to the central control board 56 and to the token accepter 60. The token acceptor 60 would then signal the control board 56 to actuate the game when the selected number of tokens were received.

To summarize, the present network 10, could permit the subscriber to gather and analyze output data 49 about the operations of the on-site token-based and related devices, manipulate or alter the operations of these devices and communicate with customers via input commands 53. Selected changes could be made to meet varying local conditions. The present network 10 could be added onto token-based and related devices either already in use or in production.

The invention claimed is:

1. An electronic network operable via the Internet for presenting output data from token-based and related devices located on-site to a subscriber located off-site and for enabling the subscriber to alter selected functions of said devices with input commands, said network comprising:

a. function monitoring and controlling means for collecting the output data from the token-based and related devices and for integrating the input commands into said devices;

b. processing means located on-site for converting the input commands into an operable form and for converting the output data into a transmissible form;

c. Internet interfacing means located on-site for receiving the input commands from the Internet and for routing the output data to the Internet;

d. transceiving means located on-site for receiving the input commands, from the interfacing means and for transmitting the output data to said interfacing means;

e. programming means embodied in a non-transitory computer-readable media located off-site for retrieving the output data from the Internet, analyzing the output data, providing a website and directing the input commands to the Internet; and f. subscriber interfacing means located off-site for enabling the subscriber to visualize the output data and generate the input commands.

2. The electronic network according to claim 1, wherein the programming means is operative in at least a dedicated portion of a server and a central software application.

3. The electronic network according to claim 1, wherein the subscriber interfacing means comprises at least one of a computer and a smart phone.

4. The electronic network according to claim 1, wherein the Internet interfacing means comprises a router.

5. The electronic network according to claim 1, wherein the token-based devices include one or more of the group comprising a token dispenser and a token-actuated game, and wherein the related devices are one or more of the group comprising a redemption ticket dispenser, a bill changer, a sales register, a sign and a camera.

6. The electronic network according to claim 5, wherein the output data includes one or more of the group comprising the number of and times when the game is played, the number of redemption tickets dispensed, the number of tokens deposited in the game, the scores achieved by a game player, the quantity of tokens discharged in a selected period of time from the token dispenser, the message being displayed on the sign, visual images of the staff, players and games provided by the camera, sales information from the sales register, customer email addresses, text message numbers and pager numbers.

7. The electronic network according to claim 6, wherein the programming means enable the subscriber to accomplish one or more of a group of tasks comprising: generating input commands, designing promotional material, tracking use of the games over time, tracking sales over time, projecting when a game is likely to be full of tokens, comparing redemption ticket output and frequency of use of the game.

8. The electronic network according to claim 6, wherein the programming means may receive and pool output data from a plurality of on-site locations.

9. The electronic network according to claim 8, wherein the programming means may analyze and provide the pooled data to a group of subscribers.

10. The electronic network according to claim 6, wherein the alterable functions effected by the input commands include one or more of a group comprising the number of tokens required to actuate the game, the number of redemption tickets dispensed, the number of tokens released by the token dispenser per unit of currency, the message displayed on the sign and the message sent to customers.

* * * * *